United States Patent
Morioka et al.

(10) Patent No.: US 11,629,243 B2
(45) Date of Patent: Apr. 18, 2023

(54) POLYAMIDE RESIN COMPOSITION AND MOLDED ARTICLE OBTAINED BY MOLDING SAME

(71) Applicant: Toray Industries, Inc., Tokyo (JP)

(72) Inventors: Nobuhiro Morioka, Nagoya (JP); Akiyoshi Tamai, Nagoya (JP); Hideyuki Umetsu, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 17/625,188

(22) PCT Filed: Jul. 7, 2020

(86) PCT No.: PCT/JP2020/026507
§ 371 (c)(1),
(2) Date: Jan. 6, 2022

(87) PCT Pub. No.: WO2021/006257
PCT Pub. Date: Jan. 14, 2021

(65) Prior Publication Data
US 2022/0204729 A1 Jun. 30, 2022

(30) Foreign Application Priority Data
Jul. 11, 2019 (JP) .............................. JP2019-128929

(51) Int. Cl.
| | |
|---|---|
| *C08K 13/02* | (2006.01) |
| *C08L 77/02* | (2006.01) |
| *C08L 77/04* | (2006.01) |
| *C08L 77/06* | (2006.01) |
| *C08K 3/32* | (2006.01) |
| *C08K 5/09* | (2006.01) |

(52) U.S. Cl.
CPC .............. *C08K 13/02* (2013.01); *C08L 77/02* (2013.01); *C08L 77/04* (2013.01); *C08L 77/06* (2013.01); *C08K 3/32* (2013.01); *C08K 5/09* (2013.01)

(58) Field of Classification Search
None
See application file for complete search history.

(56) References Cited

U.S. PATENT DOCUMENTS

| | | | |
|---|---|---|---|
| 4,701,518 A * | 10/1987 | Osborn | .................. D06M 11/62 528/319 |
| 2011/0086206 A1* | 4/2011 | Scheffer | .................... H01B 1/24 427/256 |
| 2012/0065327 A1* | 3/2012 | Ogawa | .................... C08G 69/26 528/336 |
| 2013/0065004 A1 | 3/2013 | Yamamoto et al. | |
| 2013/0197145 A1* | 8/2013 | Thompson | ............. C08K 5/098 524/397 |
| 2020/0187494 A1* | 6/2020 | Osborn | .................. D01F 1/103 |

FOREIGN PATENT DOCUMENTS

| | | |
|---|---|---|
| EP | 0 469 542 A2 | 2/1992 |
| JP | S49-509 A | 1/1974 |
| JP | S49-93642 A | 9/1974 |
| JP | H4-89864 A | 3/1992 |
| JP | H5-171038 A | 7/1993 |
| JP | 2001-200156 A | 7/2001 |
| JP | 2005-105192 A | 4/2005 |
| JP | 2015-010210 A | 1/2015 |
| WO | 2011/145498 A1 | 11/2011 |

\* cited by examiner

*Primary Examiner* — Satya B Sastri
(74) *Attorney, Agent, or Firm* — DLA Piper LLP (US)

(57) ABSTRACT

A polyamide resin composition makes it possible to obtain a molded article having excellent fluidity, excellent prying strength, and excellent adhesivity with metal. The polyamide resin composition includes 100 parts by mass of a polyamide resin (A) and 0.1 part by mass or more and 10 parts by mass or less of an ammonium salt (B) composed of a $C_{6-12}$ aliphatic dicarboxylic acid and ammonia.

6 Claims, No Drawings

POLYAMIDE RESIN COMPOSITION AND MOLDED ARTICLE OBTAINED BY MOLDING SAME

TECHNICAL FIELD

This disclosure relates to a polyamide resin composition and a molded article obtained by molding the same.

BACKGROUND

A polyamide resin, which is one kind of engineering plastic, has an excellent balance between mechanical characteristics and toughness, and thus, is used in various applications such as electrical and electronic parts, mechanical parts, and automobile parts, mainly in injection molding applications. Furthermore in recent years, modularization and weight-reduction of large automobile parts have promoted a tendency to decrease the thickness of a molded article and make electrical and electronic parts smaller and more accurate. Responding to such a demand contributive to expanding the degree of freedom of design involves enhancing the fluidity of a material to be used. A polyamide composition based on a technology of improving fluidity is disclosed (see, for example, JP H04-089864 A), in which the polyamide composition is composed of a polyamide resin, a carboxylic acid containing two or more carboxyl groups in the molecule, an amine containing two or more nitrogen atoms in the molecule, and at least one fluidity improver selected from urea and derivatives thereof.

Additionally in recent years, a trend to higher-performance electrical and electronic parts has led to the mainstream that is to design parts on the basis of a composite of a resin member and a metal member. When such a composite material is used, particularly as a connector or the like, it is desired that a housing portion or the like has high prying strength. In addition, it is important that the resin and the metal have high adhesion therebetween obtain waterproofness and sealing properties. As a technique for enhancing adhesion between a resin and metal, for example, use of a polyamide resin composition (see, for example, JP H05-171038 A) composed of a polyamide 46 resin and a surfactant or the like is disclosed.

However, forming a molded article using such a technique as disclosed in JP '864 poses a problem in that any increase in the addition amount of a fluidity improver is accompanied by volatilization of the fluidity improver or decomposition of the polyamide resin, thus decreasing the prying strength and adhesivity with metal.

On the other hand, a technique disclosed in JP '038 allows adhesivity with metal to be enhanced by addition of a surfactant, but has a problem in that the fluidity of the polyamide resin composition is insufficient.

It could therefore be helpful to provide a polyamide resin composition that makes it possible to obtain a molded article having excellent fluidity, excellent prying strength, and excellent adhesivity with metal.

SUMMARY

We thus provide:

[1] A polyamide resin composition including 100 parts by mass of a polyamide resin (A) and 0.1 part by mass or more and 10 parts by mass or less of an ammonium salt (B) composed of a $C_{6-12}$ aliphatic dicarboxylic acid and ammonia.

[2] The polyamide resin composition according to [1], wherein the polyamide resin (A) has an amide group concentration of 7.0 mmol/g or more and 10.0 mmol/g or less.

[3] The polyamide resin composition according to [1] or [2], wherein the polyamide resin composition has a sea-island structure in which the sea phase is constituted by the polyamide resin (A) alone, and the island phase is constituted by the ammonium salt (B) alone, and wherein the island phase has an average diameter of 5 nm or more and 100 nm or less.

[4] The polyamide resin composition according to any one of [1] to [3], wherein the polyamide resin composition further comprises a phosphorus-containing compound (C), and wherein [C]/[A] is $50 \times 10^{-6}$ to $3500 \times 10^{-6}$, wherein [C] is the amount of phosphorus atoms contained per the unit weight of the polyamide resin composition and determined by absorptiometry, and [A] is the amount of the polyamide resin (A).

[5] The polyamide resin composition according to any one of [1] to [4], wherein [C]/[B] is 0.02 to 0.5, wherein [B] is the amount of ammonium ions derived from the ammonium salt (B) and contained per the unit weight of the polyamide resin composition.

[6] A molded article obtained by molding the polyamide resin composition according to any one of [1] to [5].

[7] A method of producing a polyamide resin composition, comprising: introducing a polyamide resin (A) and an ammonium salt (B) composed of a $C_{6-12}$ aliphatic dicarboxylic acid and ammonia into a twin-screw extruder such that the resulting mixture contains 100 parts by mass of the polyamide resin (A) and 0.1 part by mass or more and 10 parts by mass or less of the ammonium salt (B); and melt-kneading the resulting mixture at a shear rate of 150 $\sec^{-1}$ or more and 400 $\sec^{-1}$ or less to obtain the polyamide resin composition.

We thus make it possible to obtain a polyamide resin composition having excellent fluidity, prying strength, and adhesivity with metal, and which is advantageous in forming a molded article.

DETAILED DESCRIPTION

Our compositions and molded articles will be described in detail with reference to examples. The polyamide resin composition includes 100 parts by mass of a polyamide resin (A) and 0.1 part by mass or more and 10 parts by mass or less of an ammonium salt (B) composed of a $C_{6-12}$ aliphatic dicarboxylic acid and ammonia. Below, each of the components will be described.

Polyamide Resin (A)

The amide group of the polyamide resin (A) is believed to coordinate to the below-mentioned ammonium salt (B) by virtue of hydrogen bonding. Because of this, the polyamide resin (A) is believed to have excellent compatibility with the ammonium salt (B).

The polyamide resin (A) is a resin having a structure obtained by utilizing (i) polycondensation of an aminocarboxylic acid, (ii) polycondensation of a lactam, or (iii) polycondensation of a diamine and a dicarboxylic acid, and is a resin in which 50 mol % or more of all the repeating units are the repeating units obtained by these polycondensation reactions. Such repeating units preferably account for 80 mol % or more, more preferably 90 mol % or more, of the resin. It is most preferably 100 mol %. Representative examples of raw materials for the polyamide resin (A) include: amino acids such as 4-aminobutyric acid, 6-aminocaproic acid, 11-aminoundecanoic acid, 12-aminododecanoic acid, and para-aminomethylbenzoic acid; lactams such as γ-butyrolactam, ε-caprolactam, and ω-laurolactam; aliphatic diamines such as tetramethylenediamine, pentamethylenediamine, hexamethylenediamine, 2-methylpentamethylenediamine, nonamethylenediamine, decamethylenediamine, undecamethylenediamine, dodecamethylenediamine, 2,2,4-/2,4,4-trimethylhexamethylenediamine, 5-methylnonamethylenediamine, and 2-methyloctamethylenediamine; aromatic diamines such as metaxylylenediamine and paraxylylenediamine; alicyclic diamines such as 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine; aliphatic dicarboxylic acids such as adipic acid, suberic acid, azelaic acid, sebacic acid, and dodecanedioic acid; aromatic dicarboxylic acids such as terephthalic acid, isophthalic acid, 2-chloroterephthalic acid, 2-methylterephthalic acid, 5-methylisophthalic acid, 5-sodiumsulfoisophthalic acid, 2,6-naphthalenedicarboxylic acid, hexahydroterephthalic acid, and hexahydroisophthalic acid; alicyclic dicarboxylic acids such as 1,4-cyclohexanedicarboxylic acid, 1,3-cyclohexanedicarboxylic acid, 1,2-cyclohexanedicarboxylic acid, and 1,3-cyclopentanedicarboxylic acid and the like.

The polyamide resin (A) may be a copolymer, or may be a mixture of a plurality of resins.

Specific examples of the polyamide resin (A) include, polybutyroamide (nylon 4), polycaproamide (nylon 6), polyhexamethylene adipamide (nylon 66), polytetramethylene adipamide (nylon 46), polytetramethylene sebacamide (nylon 410), polypentamethylene adipamide (nylon 56), polypentamethylene sebacamide (nylon 510), polyhexamethylene sebacamide (nylon 610), polyhexamethylene dodecamide (nylon 612), polydecamethylene adipamide (nylon 106), polydecamethylene sebacamide (nylon 1010), polydecamethylene dodecamide (nylon 1012), polyundecaneamide (nylon 11), polydodecane amide (nylon 12), polycaproamide/polyhexamethylene adipamide copolymer (nylon 6/66), polycaproamide/polyhexamethylene terephthal amide copolymer (nylon 6/6T), polyhexamethylene adipamide/polyhexamethylene terephthalamide copolymer (nylon 66/6T), polyhexamethylene adipamide/polyhexamethylene isophthalamide copolymer (nylon 66/6I), polyhexamethylene adipamide/polyhexamethylene isophthalamide/polycaproamide copolymer (nylon 66/6I/6), polyhexamethylene terephthalamide/polyhexamethylene isophthalamide copolymer (nylon 6T/6I), polyhexamethylene terephthalamide/polyundecaneamide copolymer (nylon 6T/11), polyhexamethylene terephthalamide/polydodecaneamide copolymer (nylon 6T/12), polyhexamethylene adipamide/polyhexamethylene terephthalamide/polyhexamethylene isophthalamide copolymer (nylon 66/6T/6I), polyxylylene adipamide (nylon XD6), polyxylylene sebacamide (nylon XD10), polyhexamethylene terephthalamide/polypentamethylene terephthalamide copolymer (nylon 6T/5T), polyhexamethylene terephthalamide/poly-2-methylpentamethylene terephthalamide copolymer (nylon 6T/M5T), polypentamethylene terephthalamide/polydecamethylene terephthalamide copolymer (nylon 5T/10T), polynona methylene terephthalamide (nylon 9T), polydecamethylene terephthalamide (nylon 10T), polydecamethylene terephthalamide/polyhexamethylene dodecaneamide copolymer (nylon 10T/612), polydecamethylene terephthalamide/polyhexamethylene adipamide copolymer (nylon 10T/66), polydodecamethylene terephthalamide (nylon 12T), and the like. In addition, specific examples of polyamide resins include mixtures of these materials, copolymers of the materials and the like. The symbol "/" refers to a copolymer.

The polyamide resin (A) is particularly preferably a polyamide resin having a melting point of 170° C. to 330° C. A polyamide resin having a melting point of 170° C. to 330° C. has an excellent balance between strength and toughness. A polyamide resin having a melting point of 170° C. or more can be melt-kneaded at a high resin pressure, making it possible to further enhance the dispersibility of the below-mentioned ammonium salt (B) in the polyamide resin composition, and thus, makes it possible to enhance the fluidity of the polyamide resin composition, and also to further enhance the prying strength and adhesivity with metal of the resulting molded article. In a more preferable aspect, the polyamide resin has a melting point of 200° C. or more.

On the other hand, using a polyamide resin having a melting point of 330° C. or below makes it possible to suitably control the temperature during melt-kneading, and to inhibit the decomposition of the polyamide resin (A) and the ammonium salt (B), and makes it possible to prevent the fluidity, prying strength, and adhesivity with metal of the polyamide resin composition from decreasing. The polyamide resin (A) more preferably has a melting point of 300° C. or less, still more preferably 240° C. or less.

The melting point of the polyamide resin is defined as the temperature of the peak top of an endothermic peak presented by the polyamide resin that is heated under an inert gas atmosphere using a differential scanning calorimeter at a heating rate of 20° C./min after being cooled from the molten state to 30° C. at a cooling rate of 20° C./min. When two or more endothermic peaks are detected, however, the temperature of the peak top of the endothermic peak having the largest peak intensity is regarded as the melting point.

Examples of polyamide resins having a melting point of 170° C. to 330° C. include; nylon 6; nylon 66; nylon 46; nylon 410; nylon 610; nylon 1010; nylon 56; copolymers having a hexamethylene terephthalamide unit such as nylon 6T/66, nylon 6T/6I, nylon 6T/12, nylon 6T/5T, nylon 6T/MST, and nylon 6T/6; nylon 5T/10T; nylon 9T; nylon 10T; nylon 12T; and the like. Among these, nylon 6, nylon 66, and nylon 610 that have excellent compatibility and reactivity with the ammonium salt (B) are preferably used. Nylon 6 and nylon 610 are more preferably used. Nylon 6, nylon 66, and nylon 610 have an excellent balance between mechanical characteristics and moldability, and have a relatively high melting point, and thus, can be melt-kneaded at a high resin pressure. This makes it possible to further enhance the dispersibility of the ammonium salt (B) in the polyamide resin composition, and thus, makes it possible to enhance the fluidity of the polyamide resin composition, and also to further enhance the prying strength and adhesivity with metal of the resulting molded article. It is suitable for practical use to blend two or more of these polyamide resins in accordance with desired characteristics.

The polyamide resin (A) preferably has an amide group concentration in the range of 7.0 mmol/g or more and 10.0 mmol/g or less. The polyamide resin (A) having an amide group concentration of 7.0 mmol/g or more makes it possible to further enhance the dispersibility of the ammonium salt (B) in the polyamide resin composition, and to enhance the fluidity of the polyamide resin composition, and thus, makes it possible to inhibit strain from remaining and inhibit defects from being generated, to afford good wetting to join with metal or the like, and also to perform good molding.

This makes it possible to further enhance the prying strength and adhesivity with metal of the resulting molded article. The polyamide resin (A) more preferably has an amide group concentration of 8.0 mmol/g or more. On the other hand, increasing the amide group concentration of the polyamide resin (A) can promote the dispersion of the ammonium salt (B) excessively, and the excessive dispersion rather makes it difficult to obtain the effects. Because of this, the polyamide resin (A) preferably has an amide group concentration of 10.0 mmol/g or less. The polyamide resin (A) having an amide group concentration of 10.0 mmol/g or less makes it easy to make the ammonium salt (B) suitably coordinate to the amide group portion of the polyamide resin (A), thus enabling the polyamide resin composition to achieve high fluidity, and making it possible to further enhance the prying strength and adhesivity with metal of the resulting molded article. The upper limit of the amide group concentration of the polyamide resin (A) is more preferably 9.5 mmol/g or less, still more preferably 9.0 mmol/g or less.

The amide group concentration refers to the millimole number (mmol) of the amide groups contained per 1 g of polyamide. For example, the amide group concentration of a polyamide obtained by ring-opening polymerization of a lactam having a molecular weight ma is determined in accordance with 1/ma×1000 (mmol), and the amide group concentration of a polyamide obtained by dehydration condensation of a diamine having a molecular weight mb and a dicarboxylic acid having a molecular weight mc is determined in accordance with 2/(mb+mc−18)×1000 (mmol). In this regard, the monomer species constituting a polyamide resin can be identified and quantitated by a common analysis method such as infrared spectrophotometry (IR), liquid chromatography (LC), gas chromatography (GC), mass spectrometry (mass spectrometry), or nuclear magnetic resonance analysis (NMR). Examples of methods of bringing the amide group concentration within the above-mentioned range include: a method in which a material having a desired carbon number is selected from among the materials enumerated above as raw materials for polyamides and the like.

The polyamide resin (A) is not limited to any particular degree of polymerization, and the relative viscosity (ηr) as measured at 25° C. is preferably 1.5 to 8.0 in a 98% concentrated sulfuric acid solution having a resin concentration of 0.01 g/ml. The relative viscosity of 1.5 or more makes it possible to achieve an excellent balance between mechanical characteristics and moldability and also to enhance the dispersibility of the ammonium salt (B), and thus, makes it possible to enhance the fluidity of the polyamide resin composition, and also to further enhance the prying strength and adhesivity with metal of the resulting molded article. The polyamide resin (A) more preferably has a relative viscosity of 2.0 or more. On the other hand, the relative viscosity of 8.0 or less makes it less likely to cause the ammonium salt (B) to be thermally decomposed by shear heat, and thus, makes it possible to prevent a decrease in the fluidity of the polyamide resin composition and a decrease in the prying strength and adhesivity with metal of the resulting molded article. The upper limit of the relative viscosity of the polyamide resin (A) is more preferably 6.0 or less, still more preferably 4.0 or less.

Ammonium Salt (B)

A polyamide resin composition includes an ammonium salt composed of a $C_{6-12}$ aliphatic dicarboxylic acid and ammonia (ammonium salt (B)). For explanatory purposes, the ammonium salt (B) is a compound represented by the chemical formula $(R(COO^-)_2.(NH^{4+})_2)$, wherein R represents a $C_{4-10}$ divalent aliphatic group. None of primary ammonium salts, secondary ammonium salts, tertiary ammonium salts, and quarternary ammonium salts, in which a hydrogen atom(s) in an ammonium ion is/are substituted with one or more functional groups other than a hydrogen atom, falls under the ammonium salt (B).

When a $C_{6-12}$ aliphatic dicarboxylic acid is used in place of the ammonium salt (B), such an aliphatic dicarboxylic acid has a relatively high compatibility with the polyamide resin (A), as such an aliphatic dicarboxylic acid is used as a raw material for the polyamide resin (A) in some instances. In addition, the amino group of the polyamide resin (A) can react with the carboxyl group of the aliphatic dicarboxylic acid, thus inferring that the aliphatic dicarboxylic acid is dispersed in the polyamide resin (A) to a certain degree. However, an aliphatic dicarboxylic acid is an acid, and thus, decomposes the polyamide (A) if used in an increased amount, and results in decreasing the prying strength and adhesivity with metal of the resulting molded article.

On the other hand, an ammonium salt of an aliphatic dicarboxylic acid having 5 or less carbon atoms has a relatively high compatibility with the polyamide resin (A), and thus, is inferred to be dispersed in the polyamide resin (A). However, an ammonium salt of an aliphatic dicarboxylic acid having 5 or less carbon atoms has a low molecular weight, and the ammonium salt is decomposed during production of a polyamide composition, thus resulting in decreasing the prying strength and adhesivity with metal of the resulting molded article.

Using the ammonium salt (B) composed of a $C_{6-12}$ aliphatic dicarboxylic acid and ammonia makes it possible to obtain the below-mentioned actions and effects.

That is, it is believed that the ammonium salt (B) coordinates to the amide group or the carboxyl end group of the polyamide resin (A), and thus, the ammonium salt (B) has excellent compatibility with the polyamide resin (A), and can be microdispersed in the polyamide resin composition, making it possible to enhance the fluidity of the polyamide resin composition, and enhance the prying strength and adhesivity with metal of the resulting molded article.

In addition, the ammonium salt (B) has a higher molecular weight than an ammonium salt composed of an aliphatic dicarboxylic acid having 5 or less carbon atoms and ammonia, and thus, the ammonium salt (B) is inhibited from decomposition and volatilization. In addition, the ammonium salt (B) is neutral, and thus, even if the ammonium salt is contained in a large amount, the polyamide resin is inhibited from being decomposed by an acid or base during production of the polyamide composition. This makes it possible to more effectively enhance the fluidity of the polyamide resin composition, and to enhance the prying strength and adhesivity with metal of the resulting molded article.

A polyamide resin composition has a sea-island structure in which the sea phase is constituted of the polyamide resin (A) alone, and the island phase is constituted of the ammonium salt (B) alone, and the average diameter of the island phase is preferably 5 nm or more and 100 nm or less, as determined by the below-mentioned method. We discovered that the polyamide resin (A) made to contain the ammonium salt (B) makes it possible to attempt to improve the fluidity. We also discovered that the fluidity can be further enhanced by dispersing the ammonium salt (B) in the form of islands in the polyamide resin (A). In addition, we discovered that the fluidity can be further enhanced by controlling the average diameter of the island phase of the ammonium salt (B). The term "alone" means that another component(s) may be contained in a small amount, approximately 30 mass % or less.

Allowing the island phase to have an average diameter of 5 nm or more makes it possible to inhibit entanglement of the molecules of the polyamide resin (A), and thus, makes it possible to enhance the fluidity of the polyamide resin composition. The island phase more preferably has an average diameter of 6 nm or more, still more preferably 8 nm or more, most preferably 10 nm or more. On the other hand, the island phase having an average diameter of 100 nm or less makes it possible to further enhance the prying strength and adhesivity with metal of the resulting molded article. The island phase more preferably has an average diameter of 50 nm or less, still more preferably 30 nm or less, most preferably 20 nm or less. In this regard, the average diameter of the island phase, as used herein, is determined as follows: an object made of a resin composition is cross-sectioned; the island phase is observed using a transmission electron microscope (at a magnification ratio of 10,000×); the diameter of each of 100 islands selected randomly is calculated; and the arithmetic average of these is regarded as the average diameter of the island phase. The diameter of each island is defined as the arithmetic average of the largest diameter and the smallest diameter. Specifically, an ASTM No. 4 dumbbell piece (1 mmt) is molded at any molding temperature between the melting point of the polyamide resin (A) forming the sea phase and the melting point of the polyamide resin (A)+30° C., and a flake having a thickness of 80 nm is cut out of the central portion of the dumbbell piece in the cross-sectional direction, and observed using a transmission electron microscope (at a magnification ratio of 10,000×). The largest diameter and the smallest diameter of each of 100 islands selected randomly from the image observed are determined, the average value of the diameters is regarded as the diameter of the island, and the arithmetic average of the diameters of the 100 islands is determined to be the average diameter of the island phase. The largest diameter and the smallest diameter are defined as follows: assuming that a straight line is drawn via the centroid of a figure formed by the peripheral line of an island, and that a segment connects the intersections at which the straight line first intersects the peripheral line in the direction from the centroid toward the periphery, the length of a segment drawn to be the longest is the largest diameter, and the length of a segment to be the shortest is the smallest diameter. In this regard, the dispersion state and dispersion diameter of the island phase do not change between before and after molding under common molding conditions including the molding conditions for the above-mentioned dumbbell test piece.

Examples of preferable methods of bringing the average diameter of the island phase to 100 nm or less include: a method in which the compatibility between the polyamide resin (A) and the ammonium salt (B) is enhanced. Specific examples include: using the (A) polyamide resin having a melting point within the above-mentioned preferable range; using the (A) polyamide resin having an amide group concentration within the above-mentioned preferable range; making the carbon number of a structural unit constituting the polyamide resin (A) approximate to the carbon number of the aliphatic dicarboxylic acid constituting the ammonium salt (B); and the like. Other examples include a method in which a polyamide resin composition is obtained by the below-mentioned preferable production method.

Specific examples of the ammonium salt (B) include diammonium adipate, diammonium pimelate, diammonium suberate, diammonium azelate, diammonium sebacate, ammonium dodecanedioate, and the like. If desired, two or more of these may be used. Among these, diammonium adipate and diammonium sebacate are preferably used from a viewpoint of raw material availability, performance balance, and cost.

A polyamide resin composition contains the ammonium salt (B) in an amount of 0.1 to 10 parts by mass with respect to 100 parts by mass of the polyamide resin (A). Containing the ammonium salt (B) in an amount of less than 0.1 part by mass leads to decreasing the fluidity of the polyamide resin composition and decreasing the prying strength and adhesivity with metal of the resulting molded article. The amount of the ammonium salt (B) is preferably 0.5 part by mass or more, more preferably 1 part by mass or more, with respect to 100 parts by mass of the polyamide resin (A). On the other hand, containing the ammonium salt (B) in an amount of more than 10 parts by mass leads to promoting the plasticization of the polyamide resin, and decreasing the prying strength and adhesivity with metal of the resulting molded article. The amount of the ammonium salt (B) is preferably 7.5 parts by mass or less, more preferably 6 parts by mass or less, with respect to 100 parts by mass of the polyamide resin (A).

In this regard, the amount of the ammonium salt (B) in the resin composition and the amount [B] of the ammonium ions are determined by the below-mentioned method.

When the polyamide resin composition contains an incompatible component such as inorganic particles or organic particles, such a component is separated directly, or converted into another form such as oxide and separated, and then, the above-mentioned amount per the unit weight of the polyamide resin composition is determined. Such a separation method can be suitably selected depending on the component contained, and is not subject to any particular limitation. On the other hand, when another compatible organic component or inorganic component is contained, the component that can be separated by extraction using water, an organic solvent or the like is separated by extraction, and then, the above-mentioned amount per the unit weight of the polyamide resin composition is determined. When such a method is difficult, the above-mentioned amount per the unit weight of the polyamide resin composition is determined by determining the content ratio in the composition using an analysis method such as a spectroscopic method depending on the component contained. In this regard, it is possible to use such a determination method to determine the amount of the polyamide resin (A) contained per the unit weight of the polyamide resin composition when the composition contains a compatible organic component or inorganic component.

On the other hand, the ammonium salt (B) can be extracted with water, and thus, the polyamide resin composition having a known weight is extracted for a sufficient period of time, using, for example, a Soxhlet extraction apparatus. Then, analyzing the extract using, for example, a method such as NMR, FT-IR, GC-MS, or liquid chromatograph singly or in combination depending on the component contained makes it possible to identify the chemical structure of the ammonium salt (B), and determine the amount of the ammonium salt (B) and the amount [B] of the ammonium ions.

In addition, knowing the weight of a component other than the polyamide resin (A) as above-mentioned results in determining the weight of the polyamide resin (A) per the unit weight of the polyamide resin composition.

In this regard, the below-mentioned [B]/[C] and [C]/[A] are both weight ratios, and thus, it can be easily understood that the phrase "the unit weight of the polyamide resin composition" means a criterion amount (for example, 10 g) serving as a weight suitable for calculation. In addition, the units for [A], [B], and [C] are obviously the same (for example, milligram).

Phosphorus-Containing Compound (C)

A polyamide resin composition preferably further includes a phosphorus-containing compound (phosphorus-containing compound (C)). Hitherto, a phosphorus-containing compound such as sodium hypophosphite has been used as a polycondensation catalyst for polycondensation of a polyamide, and is known to have an effect of shortening polymerization time, an effect of enhancing thermal stability by virtue of thickening during melt-kneading, and an effect of inhibiting yellowing.

Including the phosphorus-containing compound (C) together with the ammonium salt (B) makes it possible to enhance the fluidity of the polyamide resin composition, and further enhance the prying strength and adhesivity with metal of the resulting molded article. This is believed to be due to the following: the phosphorus-containing compound (C) makes it possible to inhibit decomposition of the ammonium salt (B), and at the same time further enhance compatibility between the ammonium salt (B) and the polyamide resin (A), and further enhance the dispersibility of the ammonium salt (B) in the polyamide resin composition, and in addition, the ammonium salt (B) inhibits the polycondensation catalyst effect of the phosphorus-containing compound (C), with the result that these actions make it possible to enhance the fluidity of the polyamide resin composition, and further enhance the prying strength and adhesivity with metal of the resulting molded article.

Examples of the phosphorus-containing compound (C) include phosphite compounds, phosphate compounds, phosphonite compounds, phosphonate compounds, phosphinite compounds, phosphinate compounds and the like. There is no problem with using the phosphorus-containing compound (C) in the form of a mixture of two or more compounds.

Examples of phosphite compounds include phosphorous acid, alkyl phosphite, aryl phosphite, and metal salts thereof and the like. Such alkyl esters and aryl esters may be monoesters, and may have a plurality of ester bonds such as diesters and triesters have. The same applies hereinafter. Specific examples include phosphorous acid, trimethyl phosphite, triethyl phosphite, triphenyl phosphite, bis(2,6-di-tert-butyl-4-methylphenyl)pentaerythritol-diphosphite, bis(2,4-di-tert-butylphenyl)pentaerythritol-di-phosphite, metal salts thereof and the like. Such metal salts will be described below.

Examples of phosphate compounds include phosphoric acid, alkyl phosphate, aryl phosphate, and metal salts thereof and the like. Specific examples include phosphoric acid, trimethyl phosphate, triethyl phosphate, triphenyl phosphate, metal salts thereof and the like.

Examples of phosphonite compounds include phosphonous acid, alkyl phosphonite, aryl phosphonite, alkylated phosphonous acid, arylated phosphonous acid, alkyl esters or aryl esters thereof, metal salts thereof and the like. Specific examples include phosphonous acid, dimethyl phosphonite, diethyl phosphonite, diphenyl phosphonite, methylphosphonous acid, ethylphosphonous acid, propylphosphonous acid, isopropylphosphonous acid, butylphosphonous acid, phenylphosphonous acid, tetrakis(2,4-di-t-butylphenyl)[1,1-biphenyl]-4,4'-diylbisphosphonite, tetrakis(2,4-di-t-butyl-5-methylphenyl)[1,1-biphenyl]-4,4'-diylbisphosphonite, alkyl esters or aryl esters thereof, metal salts thereof and the like.

Examples of phosphonate compounds include phosphonic acid, alkyl phosphonate, aryl phosphonate, alkylated phosphonic acid, arylated phosphonic acid, alkyl esters or aryl esters thereof, metal salts thereof and the like. Specific examples include dimethyl phosphonate, diethyl phosphonate, diphenyl phosphonate, methylphosphonic acid, ethylphosphonic acid, propylphosphonic acid, isopropylphosphonic acid, butylphosphonic acid, phenylphosphonic acid, benzylphosphonic acid, tolylphosphonic acid, xylylphosphonic acid, biphenylphosphonic acid, naphthylphosphonic acid, anthrylphosphonic acid, alkyl esters or aryl esters thereof, metal salts thereof and the like.

Examples of phosphinite compounds include phosphinous acid, alkyl phosphinite, aryl phosphinite, alkylated phosphinous acid, arylated phosphinous acid, alkyl esters or aryl esters thereof, metal salts thereof and the like. Specific examples include phosphinous acid, methyl phosphinite, ethyl phosphinite, phenyl phosphinite, methylphosphinous acid, ethylphosphinous acid, propylphosphinous acid, isopropylphosphinous acid, butylphosphinous acid, phenylphosphinous acid, dimethylphosphinous acid, diethylphosphinous acid, dipropylphosphinous acid, diisopropylphosphinous acid, dibutylphosphinous acid, diphenylphosphinous acid, alkyl esters or aryl esters thereof, metal salts thereof and the like.

Examples of phosphinate compounds include hypophosphoric acid, alkyl phosphinate, aryl phosphinate, alkylated hypophosphoric acid, arylated hypophosphoric acid, alkyl esters or aryl esters thereof, metal salt thereof, and the like. Specific examples include methyl phosphinate, ethyl phosphinate, phenyl phosphinate, methylphosphinic acid, ethylphosphinic acid, propylphosphinic acid, isopropylphosphinic acid, butylphosphinic acid, phenylphosphinic acid, tolylphosphinic acid, xylylphosphinic acid, biphenylylphosphinic acid, dimethylphosphinic acid, diethylphosphinic acid, dipropylphosphinic acid, diisopropylphosphinic acid, dibutylphosphinic acid, diphenylphosphinic acid, ditolylphosphinic acid, dixylylphosphinic acid, dibiphenylylphosphinic acid, naphthylphosphinic acid, anthrylphosphinic acid, 2-carboxyphenylphosphinic acid, alkyl esters or aryl esters thereof, metal salts thereof and the like.

Among these, phosphite compounds and phosphinate compounds are preferably used, and in this regard, these may be used in the form of a hydrate. It is still more preferable to use at least one selected from the group consisting of phosphorous acid, hypophosphoric acid, and metal salts thereof. These compounds are phosphorus-containing compounds having a large amount of phosphorus atoms, efficiently act by virtue of the ammonium salt (B), and thus, make it possible to further enhance the heat resistance and compatibility of the ammonium salt (B), to enhance the fluidity of the polyamide resin composition, and also to further enhance the prying strength and adhesivity with metal of the resulting molded article.

For a polyamide resin composition, [C]/[A] is preferably $50 \times 10^{-6}$ to $3500 \times 10^{-6}$, wherein [A] is the amount of the polyamide resin contained per the unit weight of the polyamide resin composition, and [C] is the amount of the phosphorus atoms. The amount of the phosphorus atoms refers to the weight of the phosphorus element per the unit weight of the polyamide resin composition, as determined by the below-mentioned absorptiometry. [C]/[A] being $50 \times 10^{-6}$ or more makes it possible to enhance the fluidity of the polyamide resin composition, and to further enhance the prying strength and adhesivity with metal of the resulting molded article. [C]/[A] is preferably $150 \times 10^{-6}$ or more, more preferably $200 \times 10^{-6}$ or more, still more preferably $300\times10^{-6}$ or more. On the other hand, [C]/[A] being $3500\times 10^{-6}$ or less leads to markedly inhibiting the polyamide resin composition from thickening, and makes it possible to inhibit the ammonium salt (B) from being thermally decomposed by shear heat, and to enhance the fluidity of the polyamide resin composition and the prying strength and adhesivity with metal of the resulting molded article. [C]/[A] is preferably $2500\times10^{-6}$ or less, more preferably $1500\times 10^{-6}$ or less.

Additionally, for a polyamide resin composition, the ratio [C]/[B] is preferably 0.02 to 0.5, wherein [B] is the amount of the ammonium ions, and [C] is the amount of the phosphorus atoms. Bringing [C]/[B] to 0.02 or more makes it possible to further inhibit decomposition of the ammonium salt (B), and to enhance the fluidity of the polyamide resin composition and the prying strength and adhesivity with metal of the resulting molded article. [C]/[B] is more preferably 0.04 or more, still more preferably 0.05 or more. Bringing [C]/[B] to 0.5 or less leads to decreasing the catalytic effect related to a reaction caused among the polyamide resins by the phosphorus-containing compound, makes it possible to inhibit the polyamide resin (A) from thickening, and at the same time, further enhance the dispersibility of the ammonium salt (B), and consequently makes it possible to enhance the fluidity of the polyamide resin composition, and also further enhance the prying strength and adhesivity with metal of the resulting molded article. [C]/[B] is more preferably 0.25 or less.

In this regard, the amount [C] of phosphorus atoms is determined by the below-mentioned method.

When the polyamide resin composition contains an incompatible component such as inorganic particles or organic particles, or another organic component or inorganic component that is compatible, the amount of such a component contained per the unit weight of the polyamide resin composition is measured as above-mentioned.

To determine the amount of phosphorus atoms, a polyamide resin composition weighed out preliminarily is allowed to undergo dry ashing decomposition in the coexistence of sodium carbonate decahydrate, or wet decomposition in a sulfuric acid/nitric acid/perchloric acid system or a sulfuric acid/hydrogen peroxide solution system. The phosphorus is converted to orthophosphoric acid, and then, the resulting orthophosphoric acid is allowed to react with a sulfuric acid solution of 1 mol/L molybdate to yield phosphomolybdic acid, which is then reduced with hydrazine sulfate to yield heteropoly-blue. To this, pure water is added to make up a given volume, and the resultant solution is analyzed using an absorptiometer and quantitated by a calibration curve method, whereby the amount [C] of phosphorus atoms can be determined. In this regard, an absorbance at 830 nm is used for quantitation using an absorptiometer.

Filler (D)

A polyamide resin composition can further include a filler (filler (D)). The filler (D) to be used may be either an organic filler or an inorganic filler, and may be either a fibrous filler or a non-fibrous filler. A preferable example of the filler (D) is a fibrous filler.

Examples of fibrous fillers include fibrous or whiskery fillers such as the following: glass fibers; PAN (polyacrylonitrile)-based or pitch-based carbon fibers; metal fibers such as stainless steel fibers, aluminium fibers, and brass fibers; organic fibers such as aromatic polyamide fibers; gypsum fibers; ceramic fibers; asbestos fibers; zirconia fibers; alumina fibers; silica fibers; titanium oxide fibers; silicon carbide fibers rock wool; potassium titanate whiskers; zinc oxide whiskers; calcium carbonate whiskers; wollastonite whiskers; aluminium borate whiskers; and silicon nitride whiskers. Examples of particularly preferable fibrous fillers include glass fibers and carbon fibers.

Such a glass fiber is not limited to any particular kind provided that the glass fiber is that which is generally used to reinforce a resin. For example, a glass fiber selected from long-fiber types or short-fiber types of chopped strands, milled fibers, and the like can be used. In addition, such a glass fiber may be coated or bundled with a thermoplastic resin such as an ethylene/vinyl acetate copolymer or a thermosetting resin such as an epoxy resin. Furthermore, the cross-section of the glass fiber is, but is not limited to, a circular, flat bottle-gourd-like, cocoon-like, elliptic, oval, or rectangular shape, any article similar to these or the like.

Examples of non-fibrous fillers include: non-swellable silicates such as talc, wollastonite, zeolite, sericite, mica, kaolin, clay, pyrophyllite, bentonite, asbestos, alumina silicate, and calcium silicate; swellable layer silicates typified by swellable micas such as Li-type fluorine taeniolite, Na-type fluorine taeniolite, Na-type tetrasilicon fluorine, and Li-type tetrasilicon fluorine; metal oxides such as silicon oxide, magnesium oxide, alumina, silica, diatomaceous earth, zirconium oxide, titanium oxide, iron oxide, zinc oxide, calcium oxide, tin oxide, and antimony oxide; metal carbonates such as calcium carbonate, magnesium carbonate, zinc carbonate, barium carbonate, dolomite, and hydrotalcite; metal sulfates such as calcium sulfate and barium sulfate; metal hydroxides such as magnesium hydroxide, calcium hydroxide, aluminium hydroxide, and basic magnesium carbonate; smectite-based clay minerals such as montmorillonite, beidellite, nontronite, saponite, hectorite, and sauconite; various clay minerals such as vermiculite, halloysite, kanemite, kenyte, zirconium phosphate, and titanium phosphate; glass beads; glass flakes; ceramic beads; boron nitride; aluminium nitride; silicon carbide; calcium phosphate; carbon black; graphite and the like. In the above-mentioned swellable layer silicates, exchangeable cations present between the layers may be exchanged with organic onium ions. In addition, the polyamide resin composition may contain two or more of these fillers.

A polyamide resin composition preferably contains the filler (D) in an amount of 1 to 300 parts by mass with respect to 100 parts by mass of the polyamide resin (A). The filler contained in an amount of 1 part by mass or more makes it possible to further enhance the prying strength and adhesivity with metal of the resulting molded article. The amount of the filler is more preferably 10 parts by mass or more, still more preferably 20 parts by mass or more, with respect to 100 parts by mass of the polyamide resin (A). On the other hand, the filler contained in an amount of 300 parts by mass or less allows the polyamide resin to have excellent fluidity, and allows the resulting molded article to have excellent prying strength, and excellent adhesivity with metal. The amount of the filler (D) is more preferably 200 parts by mass or less, still more preferably 100 parts by mass or less, with respect to 100 parts by mass of the polyamide resin (A).

Another Additive

Furthermore, a polyamide resin composition can contain a resin other than the polyamide resin (A), and/or any type of additive in accordance with the purpose, to the extent that the desired effects are not impaired. Specific examples of resins other than the polyamide resin (A) include polyester resins, polyolefin resins, polyolefin elastomers, modified polyphenylene ether resins, polysulfone resins, polyketone resins, polyether imide resins, polyalylate resins, polyether sulfone resins and the like. When such a resin(s) is/are added, the amount of the resin(s) is preferably 30 parts by mass or less, more preferably 20 parts by mass or less, with respect to 100 parts by mass of the polyamide resin (A) to sufficiently exert the characteristics of the polyamide resin.

In addition, specific examples of various additives include: heat stabilizers such as copper compounds, phenol compounds, sulfur compounds, and amine compounds; coupling agents such as isocyanate compounds, organic silane compounds, organic titanate compounds, organic borane compounds, and epoxy compounds; plasticizers such as polyalkylene oxide oligomer compounds, thioether compounds, and ester compounds; nucleating agents such as polyetherether ketone; metal soaps such as montanoic acid waxes, lithium stearate, and aluminium stearate; release agents such as ethylene diamine/stearic acid/sebacic acid polycondensates and silicone compounds; lubricants; anti-ultraviolet agents; colorants; flame retardants; impact modifiers; foaming agents and the like. When such an additive(s) is/are added, the amount of the additive(s) is preferably 10 parts by mass or less, more preferably 1 part by mass or less, with respect to 100 parts by mass of the polyamide resin (A) to sufficiently exert the characteristics of the polyamide resin.

Example of Method of Producing Polyamide Resin Composition

Examples of methods that can be used to produce a polyamide resin composition to be used include, but are not limited particularly to, a method in which a polyamide resin is added during polymerization, a method in which the composition is produced in a molten state, a method in which the composition is produced in a solution state and the like. A method in which the composition is produced in a molten state is preferably used from a viewpoint of enhancing the reactivity. In the production in a molten state, melt-kneading with an extruder, melt-kneading with a kneader or the like can be applied. Melt-kneading with an extruder enables continuous production, and thus, is preferable from a viewpoint of productivity. In melt-kneading with an extruder, one or more extruders out of single-screw extruders and multi-screw extruders such as twin-screw extruders, quadruple-screw extruders, twin-screw/single-screw composite extruders and the like can be used. Multi-screw extruders such as twin-screw extruders and quadruple-screw extruders are preferable from a viewpoint of enhancing the kneading performance, reactivity, and productivity. A method in which a twin-screw extruder is used for melt-kneading at a temperature equal to or higher than the melting point of the polyamide resin (A) and equal to or lower than the melting point+50° C. to obtain the resin composition is most preferable.

A kneading method to be used may be any method, for example, 1) a method in which the ammonium salt (B) and another material(s) are all added simultaneously from a main feeder to the polyamide resin (A), and the resulting mixture is kneaded (a simultaneous kneading method), 2) a method in which the ammonium salt (B) and another additive(s) are added from a main feeder to the polyamide resin (A), the resulting mixture is kneaded, then the filler (D) and another material(s) are added from a side-feeder, if desired, and the resulting mixture is kneaded (a side-feeding method).

The ratio (L/D) of the total screw length L to the screw diameter D of a twin-screw extruder is preferably 25 or more, more preferably more than 30. Bringing L/D to 25 or more makes it easy to supply the ammonium salt (B) and, if desired, another material(s) after kneading the polyamide resin (A) sufficiently. As a result, the polyamide resin (A) can be inhibited from being decomposed. In addition, such a ratio makes it possible to further enhance the dispersibility of the polyamide resin (A) and the ammonium salt (B), enhance the fluidity and molding stability of the polyamide resin composition, and also further enhance the high-temperature strength and adhesivity with metal of the resulting molded article.

At least the polyamide resin (A) is preferably supplied into a twin-screw extruder at a position upstream of the ½ point of the screw length, and melt-kneaded, more preferably supplied from the upstream end of the screw segment. The screw length refers to the length between the upstream end of the screw segment and the tip of the screw, wherein the upstream end is located at the position (feed inlet) through which the polyamide resin (A) is supplied at the root of the screw. The upstream end of the screw segment refers to a position in the screw piece, wherein the position is located at the most upstream end of the screw segment linked to the extruder.

The ammonium salt (B) is preferably supplied into the twin-screw extruder at a position downstream of the ½ point of the screw length, and melt-kneaded. Supplying the ammonium salt (B) at a position downstream of the ½ point of the screw length makes it easy to supply the ammonium salt (B) after the polyamide resin (A) is kneaded sufficiently. This results in making it possible to inhibit decomposition of the polyamide resin (A), and at the same time, further enhance the dispersibility of the polyamide resin (A) and the ammonium salt (B).

To achieve the desired effects more markedly, it is preferable to enhance the dispersibility of the ammonium salt (B) in the polyamide resin composition. Forming a fine dispersing structure in the polyamide resin composition makes it possible to enhance the fluidity and molding stability of the polyamide resin composition, and also further enhance the high-temperature strength and adhesivity with metal of the resulting molded article.

A preferable means of enhancing the dispersibility of the ammonium salt (B) in the polyamide resin composition is a method in which a nylon resin composition is sheared under a uniform shearing force, for example: a method in which the resin pressure is increased during melt-kneading at a suitably set kneading temperature; a method in which a screw arrangement is selected, for example, kneading discs that afford excellent kneadability and reactivity to molten resin are disposed at a plurality of positions; or a method in which materials are melt-kneaded while passing through an extruder a plurality of times. On the other hand, inhibiting the polyamide resin composition from being sheared excessively makes it possible to decrease thermal decomposition caused to the ammonium salt (B) by shear heat, and inhibit the prying strength and adhesivity with metal of the resulting molded article from decreasing, and thus, the shear rate is preferably 150 $sec^{-1}$ or more and 400 $sec^{-1}$ or less during melt-kneading using a twin-screw extruder.

The shear rate of 150 $sec^{-1}$ or more makes it possible to further enhance the dispersibility of the ammonium salt (B) in the polyamide resin composition, and thus, makes it possible to enhance the fluidity of the polyamide resin composition, and also to further enhance the prying strength and adhesivity with metal of the resulting molded article. The shear rate is more preferably 200 $sec^{-1}$ or more. On the other hand, the shear rate of 400 $sec^{-1}$ or less makes it possible to inhibit the polyamide resin composition from being excessively sheared, to decrease thermal decomposition of the ammonium salt (B) due to shear heat, and thus, to further enhance the prying strength and adhesivity with metal of the resulting molded article. The shear rate is more preferably 350 sec$^{-1}$ or less.

The shear rate is an index that indicates the kneadability of the molten resin being melt-kneaded using a twin-screw extruder, and is represented by equation (2):

$$\text{Shear rate (sec}^{-1}) = (\pi \times \text{screw diameter (cm)} \times \text{screw rotational speed (rms)})/\text{tip clearance (cm)} \quad (2).$$

In equation (2), the screw diameter corresponds to the outermost periphery of the extruder screw used, the screw rotational speed is a set value of a rotational speed for melt-kneading the polyamide resin composition, and the tip clearance is the smallest clearance provided between the inner periphery of the cylinder of the extruder and the outer edge of the screw. For example, when a TEX30 twin-screw extruder (L/D=45) manufactured by Japan Steel Works, Ltd. is used for melt-kneading, the screw diameter is 3 cm, the tip clearance is 0.15 cm, and the shear rate can be adjusted by changing the screw rotational speed suitably.

A polyamide resin composition thus obtained makes it possible to obtain a molded article by any kind of known method. Examples of molding methods include injection molding, injection compression molding, extrusion molding, compression molding, press molding and the like.

Applications

The polyamide resin composition and a molded article thereof can be utilized in various applications by virtue of the excellent characteristics, examples of such applications including automobile parts, electrical and electronic parts, construction components and materials, various containers, daily necessities, household sundries and sanitary goods. The polyamide resin composition and a molded article thereof are particularly preferably used in applications such as automobile electrical and electronic parts and other electrical and electronic parts that demand fluidity, prying strength, and adhesivity with metal, in particular. Specific examples of applications in which the composition and the molded article are preferably used include: automobile electrical and electronic parts such as connectors, wire harness connectors, motor parts, lamp sockets, sensor-mounted switches, and combination switches; and electrical and electronic parts, examples of which include: electrical parts such as electric generators, electric motors, potential transformers, current transformers, voltage regulators, rectifiers, resistors, inverters, relays, contacts for power, switches, circuit breakers, switches, knife switches, multipole rods, motor cases, housings and internal parts for notebook personal computers, housings and internal parts for CRT displays, housings and internal parts for printers, housings and internal parts for mobile terminals such as mobile phones, mobile personal computers, and handheld mobiles, housings for IC and LED, capacitor seats, fuse holders, various gears, various cases, and cabinets; and electronic parts such as connectors, connectors for SMT, card connector, jacks, coils, coil bobbins, sensors, LED lamps, sockets, resistors, relays, relay cases, reflectors, small switches, power source parts, coil bobbins, capacitors, variable capacitor cases, optical pickup chassis, oscillators, various terminal boards, transformers, plugs, printed boards, tuners, speakers, microphones, headphones, small motors, magnetic head bases, power modules, Si power modules, SiC power modules, semiconductors, liquid crystals, FDD carriages, FDD chassis, motor brush holders, transformer components, parabolic antennas, and computer-related parts.

EXAMPLES

Below, examples of our compositions and molded articles will be further specifically described with reference to Examples. The characteristics were evaluated in accordance with the following methods.

Melting Point of Polyamide Resin

Approximately 5 mg of polyamide resin was taken, and a measurement was made under a nitrogen atmosphere using a robot DSC (differential scanning calorimeter) RDC220 manufactured by Seiko Instruments Inc. The melting point was determined as the temperature of the peak top of an endothermic peak observed when the polyamide resin was heated to become molten, cooled to 30° C. at a cooling rate of 20° C./min, and then, heated at a heating rate of 20° C./min.

Relative Viscosity of Polyamide Resin

A 98% concentrated sulfuric acid solution having a polyamide resin concentration of 0.01 g/ml was prepared, and the relative viscosity ($\eta r$) was measured at 25° C. using an Ostwald-type viscometer.

Amide Group Concentration of Polyamide Resin

A polyamide resin in an amount of 0.06 g was weighed out into a vial, and allowed to be thermally decomposed in an aqueous solution of hydrobromic acid at 150° C. for three hours. Subsequently, adding an aqueous solution of sodium hydroxide to the solution to make the system alkaline was followed by adding toluene and ethyl chloroformate to the resulting mixture, and shaking the resulting mixture. A supernatant solution was taken out, a measurement was made under the below-mentioned conditions, the monomer species constituting the polyamide were identified, and the amide group concentration was determined on the basis of the molecular weights of the monomer species and the ratios of the species to all the monomers.

Device: gas chromatograph (Shimadzu GC-14A, manufactured by Shimadzu Corporation)

Detector: flame ionization detector

Column: NB-1 (filler, 100% methyl siloxane, manufactured by J&W Scientific)

Carrier gas: He (3.0 ml/min); column oven temperature: 150° C. to 330° C. (heated at 10° C./min)

Ammonium ion Amount [B]

Polyamide resin composition pellets were dried in vacuo at 80° C. for 12 hours, and a sample was weighed out (X [g]). Immediately thereafter, components were extracted for 24 hours using a Soxhlet device and using water as an extraction solvent, the extraction solvent was evaporated, and the weight (Y [g]) of the components extracted was determined. Then, the components extracted were used for $^1$H-NMR measurement to identify the chemical structures of the ammonium salt (B) and other components extracted. Then, the content ratio of the ammonium salt (B) in the components extracted was determined. Then, the content ratio by weight of ammonium ions in the components extracted was quantitated (as Z [%]) from the molecular weight of the ammonium salt (B) to determine the ammonium ion content (($Y \times (Z/100)/X$). A $^1$H-NMR measurement was made using a nuclear magnetic resonance device (JNM-AL400) manufactured by JEOL Ltd. under measurement conditions: solvent, heavy water; observation frequency, OBFRQ 399.65 MHz, OBSET 124.00 KHz, OBFIN 10500.00 Hz; and the number of scans, 256.

Phosphorus Atom Amount [C]

The polyamide resin composition was pelletized, and the polyamide resin composition pelletized was dried in vacuo at 80° C. for 12 hours. The polyamide resin composition sample pelletized and dried in vacuo was weighed out in an amount of 0.5 g, and then, to the sample, 20 mL of concentrated sulfuric acid and 5 mL of hydrogen peroxide were added. Then, the resulting mixture was heated to undergo wet decomposition, whereby the phosphorus contained in the composition was converted into orthophosphoric acid. Then, the decomposition solution was diluted to 500 mL with pure water. Then, 25 mL of the orthophosphoric-acid-containing solution was added to 5 mL of solution of 0.1 moL/L sodium molybdate and 1 mol/L sulfuric acid, and the resulting mixture was allowed to react with molybdate to yield phosphomolybdic acid. The phosphomolybdic acid was reduced with 2 mL of 0.1% hydrazine sulfate, and then diluted with 50 mL of pure water. Using an absorptiometer (a calibration curve method), the absorbance of the heteropoly-blue generated was measured at 830 nm for colorimetric determination, whereby the amount of the phosphorus atoms was determined. The absorptiometer used was U-3000 manufactured by Hitachi, Ltd.

Polyamide Resin (A) Amount [A]

There was scarcely any weight decrease due to decomposition of the polyamide resin (A) during production of the polyamide resin composition, and accordingly, in the Examples and Comparative Examples, the mass added was regarded as the mass of the composition.

Then, to calculate [C]/[A] and [C]/[B], the amount of each component was converted to a value used when the same amount of polyamide resin composition was used.

Average Diameter of Island Phase

The polyamide resin composition pellets were dried in vacuo at 80° C. for 12 hours, and used to produce an ASTM No. 4 dumbbell test piece having a thickness of 1 mmt, using an injection molding machine (SG75H-MIV, manufactured by Sumitomo Heavy Industries, Ltd.) under conditions: cylinder temperature, the melting point of the polyamide resin+15° C.; die temperature, 80° C.; injection speed, 100 mm/sec; and injection pressure, 98 MPa. Then, a flake having a thickness of 80 nm was cut out of the central portion of the test piece by freeze-cutting such that a vertical section of the central portion of the test piece appeared. This flake was stained with dye for a predetermined period of time to yield a test piece for observation. The test piece for observation was observed under an H7100 transmission electron microscope manufactured by Hitachi High-Tech Corporation at a magnification ratio of 10,000×, and 100 islands were selected randomly from the image observed. First, the largest diameter and smallest diameter of each island were measured to determine the average value, which was regarded as the diameter of the island. This was performed on each of the 100 islands, and the arithmetic average of the diameters of the 100 islands was regarded as the average diameter of the island phase.

Fluidity

The polyamide resin composition pellets were dried in vacuo at 80° C. for 12 hours, and injection-molded with a die 13 mm in width×200 mm in thickness×0.5 mm in length, using an injection molding machine (ROBOSHOT α-30C, manufactured by Fanuc Corporation) under conditions: cylinder temperature, the melting point of the polyamide resin+15° C.; die temperature, 80° C.; injection speed, 100 mm/sec; and injection pressure, 98 MPa. Thus, a bar flow test piece 13 mm in width×0.5 mm in thickness was produced. The bar flow length of each of 5 samples was measured at a holding pressure of 0, and the average value was determined to evaluate the fluidity. A longer flow length represents better fluidity.

Prying Strength

The polyamide resin composition pellets were dried in vacuo at 80° C. for 12 hours, and supplied into an injection molding machine (SE75EV-C160, manufactured by Sumitomo Heavy Industries, Ltd.) to be injection-molded under conditions: the melting point of the polyamide resin+15° C.; die temperature, 80° C.; injection speed, 30 mm/sec; and holding pressure, the loading peak pressure×0.6 MPa. Thus, a molded piece 2.8 mm in thickness×10 mm in length with a rectangular hole 11 mm×4 mm was yielded. One side of the resulting molded piece was fixed, and a brass-made square bar 11 mm in width×4 mm in length was inserted into the rectangular hole of the molded article. An operation in which a load was applied at an angle of 20° right and left was regarded as 1 cycle, and this cycle was repeated until the molded article was fractured. Ten molded pieces underwent this operation, and the average number of cycles counted until the test pieces cracked was determined. A larger number of cycles repeated until the fracture represents better prying strength.

Adhesion Between Resin Composition and Metal After Moisture Absorption/Thermal Drying Treatment The polyamide resin composition pellets were dried in vacuo at 80° C. for 12 hours, and molded using an injection molding machine (UH1000, manufactured by Nissei Plastic Industrial Co., Ltd. (80 t)) under conditions: cylinder temperature, the melting point of the polyamide resin+15° C.; die temperature, 80° C.; injection speed, 30 mm/sec; and holding pressure, the loading peak pressure×0.6 MPa, such that the pellets 30 mm in length×5 mm in thickness cover a square aluminium-made column 5 mm in width×5 mm in thickness×50 mm in length to be 10 mm apart from both ends of the column (the external dimensions of the molded portion is 15 mm in width×15 mm in thickness×30 mm in length). Thus, 50 metal-adhered test pieces for moisture absorption/drying cycles were produced. Then, the resulting test pieces were allowed to undergo moisture absorption treatment in a thermo-hygrostat at 65° C./90% RH for 48 hours, and then dried using a hot-air dryer at 110° C. for 24 hours. After the moisture absorption/drying treatment, the test pieces were immersed in red ink, washed with water, and dried, and the test pieces were observed under a stereoscopic microscope to be checked for any crack (a liquid penetrant inspection method). The number of test pieces that were recognized as exuding ink from the part where the resin and the metal were adhered was counted. The smaller the number, the better the adhesion.

Reference Example 1 (A-4)

Into a polymerization reactor, 900 g of 1010 salt, which was an equimolar salt of decamethylene diamine and sebacic acid, 41.4 g of aqueous solution of 10 weight % decamethylene diamine, and 0.4 g of sodium hypophosphite were fed, and the polymerization reactor was hermetically sealed, and purged with nitrogen. The heater temperature was set to 220° C., and heating was started. After the pressure in the reactor reached 0.5 MPa, the pressure in the reactor was retained at 0.5 MPa for 1.5 hours while moisture was discharged out of the system. Then, the pressure in the reactor was returned to normal pressure over 10 minutes, and the polymer was further allowed to react under a nitrogen flow for 1.5 hours, whereafter the polymerization was completed. Then, the polymer was discharged in gut form out of the polymerization reactor, pelletized, and dried in vacuo at 80° C. for 24 hours to yield a polyamide 1010 resin having a melting point of 195° C., an ηr of 2.75, and an amide group concentration of 5.91 mmol/g.

Reference Example 2 (A-5)

Into a polymerization reactor, 1000 g of 46 salt, which was an equimolar salt of butane diamine and adipic acid, 30.48 g of aqueous solution of 10 weight % butane diamine, and 0.5 g of sodium hypophosphite were fed, and the polymerization reactor was hermetically sealed, and purged with nitrogen. The heater temperature was set to 320° C., and heating was started. After the pressure in the reactor reached 1.5 MPa, the pressure in the reactor was retained at 1.5 MPa for 1.5 hours while moisture was discharged out of the system. Then, the pressure in the reactor was returned to normal pressure over 10 minutes, and the polymer was further allowed to react under a nitrogen flow for 1.5 hours, whereafter the polymerization was completed. Then, the polymer was discharged in gut form out of the polymerization reactor, pelletized, and dried in vacuo at 100° C. for 24 hours to yield a polyamide 46 resin having a melting point of 295° C., an ηr of 2.64, and an amide group concentration of 10.09 mmol/g.

Reference Example 3 (E-5)

Into an egg-plant shaped flask, 30 g of adipic acid (manufactured by Fujifilm Wako Pure Chemical Corporation), 49.7 g of trishydroxymethylaminomethane (manufactured by Tokyo Chemical Industry Co., Ltd.), and 500 g of water were weighed out. Then, the contents in the egg-plant shaped flask were stirred with a stirrer under heating at 80° C. for 120 minutes, and water was removed from the resulting solution to yield white powder E-5.

The polyamide resin (A), the ammonium salt (B) composed of a $C_{6-12}$ aliphatic dicarboxylic acid and ammonia, the phosphorus-containing compound (C), and other additives (E) used in the Examples and Comparative Examples are as below-mentioned.

Polyamide Resin (A)

(A-1): Nylon 6 resin having a melting point of 225° C. ("AMILAN" (registered trademark) CM1010 manufactured by Toray Industries, Inc.), an ηr of 2.70, and an amide group concentration of 8.84 mmol/g.

(A-2): Nylon 66 resin having a melting point of 260° C. ("AMILAN" (registered trademark) CM3001-N manufactured by Toray Industries, Inc.), an ηr of 2.78, and an amide group concentration of 8.84 mmol/g.

(A-3): Nylon 610 resin having a melting point of 223° C. ("AMILAN" (registered trademark) CM2001 manufactured by Toray Industries, Inc.), an ηr of 2.70, and an amide group concentration of 7.08 mmol/g.

(A-4): Nylon 1010 resin of Reference Example 1

(A-5): Nylon 46 resin of Reference Example 2

Ammonium Salt (B)

(B-1): Diammonium adipate (manufactured by Fujifilm Wako Pure Chemical Corporation)

(B-2): Diammonium sebacate (manufactured by Fujifilm Wako Pure Chemical Corporation)

Phosphorus-Containing Compound (C)

(C-1): Sodium hypophosphite monohydrate (manufactured by Fujifilm Wako Pure Chemical Corporation)

Other Additives (E)

(E-1) Adipic acid (manufactured by Fujifilm Wako Pure Chemical Corporation)

(E-2) Sodium adipate (manufactured by Tokyo Chemical Industry Co., Ltd.)

(E-3) Diammonium succinate (manufactured by Kanto Chemical Co., Inc.)

(E-4) Triammonium citrate (manufactured by Fujifilm Wako Pure Chemical Corporation)

(E-5) Compound of Reference Example 3

(E-6) Ammonium benzoate (manufactured by Fujifilm Wako Pure Chemical Corporation)

(E-7) Hexamethylene diamine (manufactured by Fujifilm Wako Chemical Corporation)

(E-8) Polyethylene glycol monostearate (manufactured by Fujifilm Wako Chemical Corporation)

(E-9) Low-density polyethylene having a melting point of 120° C. ("FLO-THENE" (registered trademark) MG201SN, manufactured by Sumitomo Seika Chemicals Company, Limited)

Examples 1 to 22 and Comparative Examples 1 to 17

The polyamide resin (A), the ammonium salt (B), the phosphorus-containing compound (C), and the other additives (E) listed in Examples 1 to 19 and Comparative Examples 1 to 17 in Tables 1 to 3 were supplied through the main feeder at a discharge amount of 30 kg/hr into a TEX30 twin-screw extruder (L/D=45) manufactured by Japan Steel Works, Ltd. with the cylinder temperature set to the melting point of the polyamide resin (A)+15° C. and with the screw rotational speed set to 200 rpm. The resulting mixture was melt-kneaded. The gut discharged out of the die was immediately cooled in a water bath, and pelletized with a strand cutter. The shear rate was 209 $sec^{-1}$.

In Example 20 as in Table 2, the same melt-kneading as above-mentioned was performed except that the screw rotational speed was changed to 120 rpm. The shear rate was 126 $sec^{-1}$.

In Example 21 as in Table 2, the same melt-kneading as above-mentioned was performed except that the screw rotational speed was changed to 300 rpm. The shear rate was 314 $sec^{-1}$.

In Example 22 as in Table 2, the same melt-kneading as above-mentioned was performed except that the screw rotational speed was changed to 400 rpm. The shear rate was 419 $sec^{-1}$. The evaluation results of each of the Examples and Comparative Examples are tabulated in Tables 1 to 3.

TABLE 1

|  |  |  | Example 1 | Example 2 | Example 3 | Example 4 | Example 5 |
|---|---|---|---|---|---|---|---|
| Polyamide resin (A) | (A-1) Nylon 6 | parts by mass | 100 | 100 | 100 | 100 | 100 |
|  | (A-2) Nylon 66 | parts by mass | — | — | — | — | — |
|  | (A-3) Nylon 610 | parts by mass | — | — | — | — | — |
|  | (A-4) Nylon 1010 | parts by mass | — | — | — | — | — |
|  | (A-5) Nylon 46 | parts by mass | — | — | — | — | — |
| Ammonium salt (B) | (B-1) Diammonium adipate | parts by mass | 0.2 | 1.0 | 3.0 | 7.0 | 9.0 |
|  | (B-2) Diammonium sebacate | parts by mass | — | — | — | — | — |

TABLE 1-continued

| | | | | | | | |
|---|---|---|---|---|---|---|---|
| Phosphorus-containing compound (C) | (C-1) Sodium Hypophosphite monohydrate | parts by mass | — | — | — | — | — |
| Other additives (E) | (E-1) Adipic acid | parts by mass | — | — | — | — | — |
| | (E-2) Sodium adipate | parts by mass | — | — | — | — | — |
| | (E-3) Diammonium succinate | parts by mass | — | — | — | — | — |
| | (E-4) Triammonium citrate | parts by mass | — | — | — | — | — |
| | (E-5) Compound of Reference Example 3 | parts by mass | — | — | — | — | — |
| | (E-6) Ammonium benzoate | parts by mass | — | — | — | — | — |
| | (E-7) Hexamethylenediamine | parts by mass | — | — | — | — | — |
| | (E-8) Polyethylene glycol monostearate | parts by mass | — | — | — | — | — |
| | (E-9) Low-density polyethylene | parts by mass | — | — | — | — | — |
| [C]/[A] | | $\times 10^{-6}$ | — | — | — | — | — |
| [C]/[B] | | | — | — | — | — | — |
| Average diameter of island phase | Average diameter of 100 islands | nm | <5 | 8 | 18 | 45 | 73 |
| Fluidity | 13 mm wide × 0.5 mm thick bar flow length | mm | 74 | 92 | 132 | 151 | 178 |
| Prying strength | Number of prying test cycles repeated under load until fracture | times | 107 | 125 | 170 | 143 | 101 |
| Adhesivity with metal | Number of test pieces recognized as exuding ink (out of 50 pieces) | pcs | 4 | 2 | 1 | 3 | 5 |

| | | | Example 6 | Example 7 | Example 8 | Example 9 | Example 10 |
|---|---|---|---|---|---|---|---|
| Polyamide resin (A) | (A-1) Nylon 6 | parts by mass | 100 | 100 | 100 | 100 | 100 |
| | (A-2) Nylon 66 | parts by mass | — | — | — | — | — |
| | (A-3) Nylon 610 | parts by mass | — | — | — | — | — |
| | (A-4) Nylon 1010 | parts by mass | — | — | — | — | — |
| | (A-5) Nylon 46 | parts by mass | — | — | — | — | — |
| Ammonium salt (B) | (B-1) Diammonium adipate | parts by mass | — | 3.0 | 3.0 | 3.0 | 3.0 |
| | (B-2) Diammonium sebacate | parts by mass | 3.0 | — | — | — | — |
| Phosphorus-containing compound (C) | (C-1) Sodium Hypophosphite monohydrate | parts by mass | — | 0.015 | 0.03 | 0.06 | 0.1 |
| Other additives (E) | (E-1) Adipic acid | parts by mass | — | — | — | — | — |
| | (E-2) Sodium adipate | parts by mass | — | — | — | — | — |
| | (E-3) Diammonium succinate | parts by mass | — | — | — | — | — |
| | (E-4) Triammonium citrate | parts by mass | — | — | — | — | — |
| | (E-5) Compound of Reference Example 3 | parts by mass | — | — | — | — | — |
| | (E-6) Ammonium benzoate | parts by mass | — | — | — | — | — |
| | (E-7) Hexamethylenediamine | parts by mass | — | — | — | — | — |
| | (E-8) Polyethylene glycol monostearate | parts by mass | — | — | — | — | — |
| | (E-9) Low-density polyethylene | parts by mass | — | — | — | — | — |
| [C]/[A] | | $\times 10^{-6}$ | — | 46 | 85 | 175 | 285 |
| [C]/[B] | | | — | 0.008 | 0.015 | 0.028 | 0.049 |
| Average diameter of island phase | Average diameter of 100 islands | nm | 40 | 18 | 17 | 15 | 13 |
| Fluidity | 13 mm wide × 0.5 mm thick bar flow length | mm | 115 | 132 | 133 | 135 | 141 |
| Prying strength | Number of prying test cycles repeated under load until fracture | times | 150 | 170 | 175 | 178 | 191 |
| Adhesivity with metal | Number of test pieces recognized as exuding ink (out of 50 pieces) | pcs | 2 | 1 | 1 | 0 | 0 |

| | | | Example 11 | Example 12 | Example 13 | Example 14 |
|---|---|---|---|---|---|---|
| Polyamide resin (A) | (A-1) Nylon 6 | parts by mass | 100 | 100 | 100 | 100 |
| | (A-2) Nylon 66 | parts by mass | — | — | — | — |
| | (A-3) Nylon 610 | parts by mass | — | — | — | — |
| | (A-4) Nylon 1010 | parts by mass | — | — | — | — |
| | (A-5) Nylon 46 | parts by mass | — | — | — | — |

TABLE 1-continued

|  |  |  |  |  |  |  |
|---|---|---|---|---|---|---|
| Ammonium salt (B) | (B-1) Diammonium adipate | parts by mass | 3.0 | 3.0 | 3.0 | 3.0 |
|  | (B-2) Diammonium sebacate | parts by mass | — | — | — | — |
| Phosphorus-containing compound (C) | (C-1) Sodium Hypophosphite monohydrate | parts by mass | 0.3 | 0.6 | 1.2 | 1.5 |
| Other additives (E) | (E-1) Adipic acid | parts by mass | — | — | — | — |
|  | (E-2) Sodium adipate | parts by mass | — | — | — | — |
|  | (E-3) Diammonium succinate | parts by mass | — | — | — | — |
|  | (E-4) Triammonium citrate | parts by mass | — | — | — | — |
|  | (E-5) Compound of Reference Example 3 | parts by mass | — | — | — | — |
|  | (E-6) Ammonium benzoate | parts by mass | — | — | — | — |
|  | (E-7) Hexamethylenediamine | parts by mass | — | — | — | — |
|  | (E-8) Polyethylene glycol monostearate | parts by mass | — | — | — | — |
|  | (E-9) Low-density polyethylene | parts by mass | — | — | — | — |
| [C]/[A] |  | ×10$^{-6}$ | 860 | 1749 | 3430 | 4280 |
| [C]/[B] |  | — | 0.15 | 0.29 | 0.58 | 0.72 |
| Average diameter of island phase | Average diameter of 100 islands | nm | 12 | 17 | 34 | 56 |
| Fluidity | 13 mm wide × 0.5 mm thick bar flow length | mm | 149 | 147 | 138 | 126 |
| Prying strength | Number of prying test cycles repeated under load until fracture | times | 213 | 203 | 181 | 166 |
| Adhesivity with metal | Number of test pieces recognized as exuding ink (out of 50 pieces) | pcs | 0 | 0 | 1 | 1 |

TABLE 2

|  |  |  | Example 3 | Example 15 | Example 16 | Example 17 | Example 18 |
|---|---|---|---|---|---|---|---|
| Polyamide resin (A) | (A-1) Nylon 6 | parts by mass | 100 | — | — | — | — |
|  | (A-2) Nylon 66 | parts by mass | — | 100 | — | — | — |
|  | (A-3) Nylon 610 | parts by mass | — | — | 100 | 100 | — |
|  | (A-4) Nylon 1010 | parts by mass | — | — | — | — | 100 |
|  | (A-5) Nylon 46 | parts by mass | — | — | — | — | — |
| Ammonium salt (B) | (B-1) Diammonium adipate | parts by mass | 3.0 | 3.0 | 3.0 | — | 3.0 |
|  | (B-2) Diammonium sebacate | parts by mass | — | — | — | 3.0 | — |
| Phosphorus-containing compound (C) | (C-1) Sodium hypophosphite monohydrate | parts by mass | — | — | — | — | — |
| Other additives (E) | (E-1) Adipic acid | parts by mass | — | — | — | — | — |
|  | (E-2) Sodium adipate | parts by mass | — | — | — | — | — |
|  | (E-3) Diammonium succinate | parts by mass | — | — | — | — | — |
|  | (E-4) Triammonium citrate | parts by mass | — | — | — | — | — |
|  | (E-5) Compound of Reference Example 3 | parts by mass | — | — | — | — | — |
|  | (E-6) Ammonium benzoate | parts by mass | — | — | — | — | — |
|  | (E-7) Hexamethylenediamine | parts by mass | — | — | — | — | — |
|  | (E-8) Polyethylene glycol monostearate | parts by mass | — | — | — | — | — |
|  | (E-9) Low-density polyethylene | parts by mass | — | — | — | — | — |
| [C]/[A] |  | ×10$^{-6}$ | — | — | — | — | — |
| [C]/[B] |  |  | — | — | — | — | — |
| Average diameter of island phase | Average diameter of 100 islands | nm | 18 | 8 | 33 | 20 | 62 |
| Fluidity | 13 mm wide × 0.5 mm thick bar flow length | mm | 132 | 128 | 125 | 129 | 103 |
| Prying strength | Number of prying test cycles repeated under load until fracture | times | 170 | 121 | 188 | 210 | 217 |
| Adhesivity with metal | Number of test pieces recognized as exuding ink (out of 50 pieces) | pcs | 1 | 4 | 2 | 1 | 4 |

|  |  |  | Example 19 | Example 20 | Example 21 | Example 22 |
|---|---|---|---|---|---|---|
| Polyamide resin (A) | (A-1) Nylon 6 | parts by mass | — | 100 | 100 | 100 |
|  | (A-2) Nylon 66 | parts by mass | — | — | — | — |

TABLE 2-continued

|  |  |  |  |  |  |  |
|---|---|---|---|---|---|---|
|  | (A-3) Nylon 610 | parts by mass | — | — | — | — |
|  | (A-4) Nylon 1010 | parts by mass | — | — | — | — |
|  | (A-5) Nylon 46 | parts by mass | 100 | — | — | — |
| Ammonium salt (B) | (B-1) Diammonium adipate | parts by mass | 3.0 | 3.0 | 3.0 | 3.0 |
|  | (B-2) Diammonium sebacate | parts by mass | — | — | — | — |
| Phosphorus-containing compound (C) | (C-1) Sodium Hypophosphite monohydrate | parts by mass | — | — | — | — |
| Other additives (E) | (E-1) Adipic acid | parts by mass | — | — | — | — |
|  | (E-2) Sodium adipate | parts by mass | — | — | — | — |
|  | (E-3) Diammonium succinate | parts by mass | — | — | — | — |
|  | (E-4) Triammonium citrate | parts by mass | — | — | — | — |
|  | (E-5) Compound of Reference Example 3 | parts by mass | — | — | — | — |
|  | (E-6) Ammonium benzoate | parts by mass | — | — | — | — |
|  | (E-7) Hexamethylenediamine | parts by mass | — | — | — | — |
|  | (E-8) Polyethylene glycol monostearate | parts by mass | — | — | — | — |
|  | (E-9) Low-density polyethylene | parts by mass | — | — | — | — |
| [C]/[A] |  | ×10$^{-6}$ | — | — | — | — |
| [C]/[B] |  |  | — | — | — | — |
| Average diameter of island phase | Average diameter of 100 islands | nm | <5 | 36 | 13 | <5 |
| Fluidity | 13 mm wide × 0.5 mm thick bar flow length | mm | 121 | 125 | 134 | 123 |
| Prying strength | Number of prying test cycles repeated under load until fracture | times | 100 | 165 | 183 | 166 |
| Adhesivity with metal | Number of test pieces recognized as exuding ink (out of 50 pieces) | pcs | 4 | 2 | 0 | 3 |

TABLE 3

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Polyamide resin (A) | (A-1) Nylon 6 | parts by mass | 100 | 100 | 100 | 100 | 100 | 100 |
|  | (A-2) Nylon 66 | parts by mass | — | — | — | — | — | — |
|  | (A-3) Nylon 610 | parts by mass | — | — | — | — | — | — |
|  | (A-4) Nylon 1010 | parts by mass | — | — | — | — | — | — |
|  | (A-5) Nylon 46 | parts by mass | — | — | — | — | — | — |
| Ammonium salt (B) | (B-1) Diammonium adipate | parts by mass | — | 12.0 | — | — | — | — |
|  | (B-2) Diammonium sebacate | parts by mass | — | — | — | — | — | — |
| Phosphorus-containing compound (C) | (C-1) Sodium hypophosphite monohydrate | parts by mass | — | — | — | — | — | — |
| Other additives (E) | (E-1) Adipic acid | parts by mass | — | — | 3.0 | — | — | — |
|  | (E-2) Sodium adipate | parts by mass | — | — | — | 3.0 | — | — |
|  | (E-3) Diammonium succinate | parts by mass | — | — | — | — | 3.0 | — |
|  | (E-4) Triammonium citrate | parts by mass | — | — | — | — | — | 3.0 |
|  | (E-5) Compound of Reference Example 3 | parts by mass | — | — | — | — | — | — |
|  | (E-6) Ammonium benzoate | parts by mass | — | — | — | — | — | — |
|  | (E-7) Hexamethylenediamine | parts by mass | — | — | — | — | — | — |
|  | (E-8) Polyethylene glycol monostearate | parts by mass | — | — | — | — | — | — |
|  | (E-9) Low-density polyethylene | parts by mass | — | — | — | — | — | — |

TABLE 3-continued

| | | | | | | | | |
|---|---|---|---|---|---|---|---|---|
| [C]/[A] | | ×10⁻⁶ | — | — | — | — | — | — |
| [C]/[B] | | — | — | — | — | — | — | — |
| Average diameter of island phase | Average diameter of 100 islands | nm | — | 95 | <5 | <5 | <5 | 37 |
| Fluidity | 13 mm wide × 0.5 mm thick bar flow length | mm | 61 | 191 | 127 | 108 | 68 | 93 |
| Prying strength | Number of prying test cycles repeated under load until fracture | times | 93 | 78 | 54 | 61 | 78 | 71 |
| Adhesivity with metal | Number of test pieces recognized as exuding ink (out of 50 pieces) | pcs | 10 | 10 | 23 | 19 | 16 | 17 |

| | | | Comparative Example 7 | Comparative Example 8 | Comparative Example 9 | Comparative Example 10 | Comparative Example 11 | Comparative Example 12 |
|---|---|---|---|---|---|---|---|---|
| Polyamide resin (A) | (A-1) Nylon 6 | parts by mass | 100 | 100 | 100 | 100 | 100 | — |
| | (A-2) Nylon 66 | parts by mass | — | — | — | — | — | 100 |
| | (A-3) Nylon 610 | parts by mass | — | — | — | — | — | — |
| | (A-4) Nylon 1010 | parts by mass | — | — | — | — | — | — |
| | (A-5) Nylon 46 | parts by mass | — | — | — | — | — | — |
| Ammonium salt (B) | (B-1) Diammonium adipate | parts by mass | — | — | — | — | — | — |
| | (B-2) Diammonium sebacate | parts by mass | — | — | — | — | — | — |
| Phosphorus-containing compound (C) | (C-1) Sodium hypophosphite monohydrate | parts by mass | — | — | — | — | 0.3 | — |
| Other additives (E) | (E-1) Adipic acid | parts by mass | — | — | — | — | — | — |
| | (E-2) Sodium adipate | parts by mass | — | — | — | — | — | — |
| | (E-3) Diammonium succinate | parts by mass | — | — | — | — | — | — |
| | (E-4) Triammonium citrate | parts by mass | — | — | — | — | — | — |
| | (E-5) Compound of Reference Example 3 | parts by mass | 3.0 | — | — | — | — | — |
| | (E-6) Ammonium benzoate | parts by mass | — | 3.0 | — | — | — | — |
| | (E-7) Hexamethylenediamine | parts by mass | — | — | 3.0 | — | — | — |
| | (E-8) Polyethylene glycol monostearate | parts by mass | — | — | — | 3.0 | — | — |
| | (E-9) Low-density polyethylene | parts by mass | — | — | — | — | — | — |
| [C]/[A] | | ×10⁻⁶ | — | — | — | — | 855 | — |
| [C]/[B] | | — | — | — | — | — | — | — |
| Average diameter of island phase | Average diameter of 100 islands | nm | 70 | 58 | <5 | 88 | — | — |
| Fluidity | 13 mm wide × 0.5 mm thick bar flow length | mm | 70 | 72 | 68 | 64 | 57 | 72 |
| Prying strength | Number of prying test cycles repeated under load until fracture | times | 75 | 84 | 83 | 90 | 89 | 74 |
| Adhesivity with metal | Number of test pieces recognized as exuding ink (out of 50 pieces) | pcs | 17 | 10 | 13 | 5 | 11 | 11 |

| | | | Comparative Example 13 | Comparative Example 14 | Comparative Example 15 | Comparative Example 16 | Comparative Example 17 |
|---|---|---|---|---|---|---|---|
| Polyamide resin (A) | (A-1) Nylon 6 | parts by mass | — | — | — | — | — |
| | (A-2) Nylon 66 | parts by mass | — | — | — | — | — |
| | (A-3) Nylon 610 | parts by mass | 100 | — | — | — | — |
| | (A-4) Nylon 1010 | parts by mass | — | 100 | — | — | — |
| | (A-5) Nylon 46 | parts by mass | — | — | 100 | — | — |

TABLE 3-continued

| | | | | | | | | |
|---|---|---|---|---|---|---|---|---|
| Ammonium salt (B) | (B-1) Diammonium adipate | parts by mass | — | — | — | — | 3.0 |
| | (B-2) Diammonium sebacate | parts by mass | — | — | — | — | — |
| Phosphorus-containing compound (C) | (C-1) Sodium hypophosphite monohydrate | parts by mass | — | — | — | — | — |
| Other additives (E) | (E-1) Adipic acid | parts by mass | — | — | — | — | — |
| additives (E) | (E-2) Sodium adipate | parts by mass | — | — | — | — | — |
| | (E-3) Diammonium succinate | parts by mass | — | — | — | — | — |
| | (E-4) Triammonium citrate | parts by mass | — | — | — | — | — |
| | (E-5) Compound of Reference Example 3 | parts by mass | — | — | — | — | — |
| | (E-6) Ammonium benzoate | parts by mass | — | — | — | — | — |
| | (E-7) Hexamethylenediamine | parts by mass | — | — | — | — | — |
| | (E-8) Polyethylene glycol monostearate | parts by mass | — | — | — | — | — |
| | (E-9) Low-density polyethylene | parts by mass | — | — | — | 100 | 100 |
| [C]/[A] | | ×10$^{-6}$ | — | — | — | — | — |
| [C]/[B] | | | — | — | — | — | — |
| Average diameter of island phase | Average diameter of 100 islands | nm | — | — | — | — | >100 |
| Fluidity | 13 mm wide × 0.5 mm thick bar flow length | mm | 59 | 50 | 80 | 45 | 55 |
| Prying strength | Number of prying test cycles repeated under load until fracture | times | 98 | 110 | 68 | 125 | 120 |
| Adhesivity with metal | Number of test pieces recognized as exuding ink (out of 50 pieces) | pcs | 10 | 20 | 8 | 45 | 40 |

In Examples 1 to 22, as compared to Comparative Examples 1 to 17, containing a specific amount of the ammonium salt (B) composed of a $C_{6-12}$ aliphatic dicarboxylic acid and ammonia made it possible to inhibit decomposition of the polyamide resin (A), and at the same time, obtain the polyamide resin (A) in which the ammonium salt (B) is microdispersed, consequently making it possible to obtain a molded article having excellent fluidity, excellent prying strength, and excellent adhesivity with metal.

In Examples 8 to 13, as compared to Examples 1 to 5, 7, and 14, containing a specific amount of the phosphorus-containing compound (C) made it possible to inhibit decomposition of the ammonium salt (B), and at the same time, further enhance the compatibility between the polyamide resin (A) and the ammonium salt (B), consequently making it possible to obtain a molded article having excellent fluidity, excellent prying strength, and excellent adhesivity with metal.

In Examples 9 to 12, as compared to Examples 8 and 13, having the ratio [C]/[B] between the ammonium ion amount [B] and the phosphorus atom amount [C] in a more preferable range made it possible to inhibit decomposition of the ammonium salt (B), and at the same time, further enhance the compatibility between the polyamide resin (A) and the ammonium salt (B), consequently making it possible to obtain a molded article having excellent fluidity, excellent prying strength, and excellent adhesivity with metal.

In Examples 3 and 15 to 17, as compared to Examples 18 and 19, having the amide group concentration of the polyamide resin (A) in a more preferable range made it possible to further enhance the compatibility between the polyamide resin (A) and the ammonium salt (B), consequently making it possible to obtain a molded article having excellent fluidity, excellent prying strength, and excellent adhesivity with metal.

In Examples 3 and 21, as compared to Examples 20 and 22, having the shear rate during melt-kneading in a more preferable range made it possible to inhibit decomposition of the ammonium salt (B), and at the same time, further enhance the compatibility between the polyamide resin (A) and the ammonium salt (B), consequently making it possible to obtain a molded article having excellent fluidity, excellent prying strength, and excellent adhesivity with metal.

The invention claimed is:

1. A polyamide resin composition comprising 100 parts by mass of a polyamide resin (A) and 0.1 part by mass or more and 10 parts by mass or less of an ammonium salt (B) represented by the chemical formula $(R(COO^-)_2 \cdot (NH_4^+)_2)$, wherein R represents a $C_{4-10}$ divalent aliphatic group, said polyamide resin composition has a sea-island structure in which a sea phase is constituted of said polyamide resin (A) alone, an island phase is constituted of said ammonium salt (B) alone, and wherein said island phase has an average diameter of 5 nm or more and 100 nm or less.

2. The polyamide resin composition according to claim 1, wherein said poly-amide resin (A) has an amide group concentration of 7.0 mmol/g or more and 10.0 mmol/g or less.

3. The polyamide resin composition according to claim 1, wherein said polyamide resin composition further comprises a phosphorus-containing compound (C), and [C]/[A] is $50 \times 10^{-6}$ to $3500 \times 10^{-6}$, wherein [C] is an amount of phosphorus atoms contained per unit weight of said polyamide resin composition and determined by absorptiometry, and [A] is an amount of said polyamide resin (A).

4. The polyamide resin composition according to claim 1, wherein [C]/[B] is 0.02 to 0.5, wherein [B] is an amount of ammonium ions derived from said ammonium salt (B) and contained per unit weight of said polyamide resin composition.

5. A molded article obtained by molding said polyamide resin composition according to claim 1.

6. A method of producing a polyamide resin composition, comprising: introducing 1) a polyamide resin (A) and 2) an ammonium salt (B) represented by the chemical formula $(R(COO^-)_2.(NH_4^+)_2)$, wherein R represents a $C_{4-10}$ divalent aliphatic group, said polyamide resin composition has a sea-island structure in which a sea phase is constituted of said polyamide resin (A) alone, an island phase is constituted of said ammonium salt (B) alone, and wherein said island phase has an average diameter of 5 nm or more and 100 nm or less, into a twin-screw extruder such that a resulting mixture contains 100 parts by mass of said polyamide resin (A) and 0.1 part by mass or more and 10 parts by mass or less of said ammonium salt (B); and melt-kneading said resulting mixture at a shear rate of 150 sec$^{-1}$ or more and 400 sec$^{-1}$ or less to obtain said polyamide resin composition.

* * * * *